(12) United States Patent
Elms (10) Patent No.: US 7,518,840 B2
(45) Date of Patent: Apr. 14, 2009

(54) ELECTRICAL SWITCHING APPARATUS AND RECEPTACLE INCLUDING AUTOMATIC MISWIRING PROTECTION

(75) Inventor: Robert T. Elms, Monroeville, PA (US)

(73) Assignee: Eaton Corporation, Cleveland, OH (US)

( * ) Notice: Subject to any disclaimer, the term of this patent is extended or adjusted under 35 U.S.C. 154(b) by 437 days.

(21) Appl. No.: 11/353,501

(22) Filed: Feb. 14, 2006

(65) Prior Publication Data
US 2007/0188955 A1 Aug. 16, 2007

(51) Int. Cl.
H02H 3/00 (2006.01)
H02H 9/08 (2006.01)

(52) U.S. Cl. ....................................... 361/42
(58) Field of Classification Search ............... 361/42
See application file for complete search history.

(56) References Cited

U.S. PATENT DOCUMENTS

| 3,736,468 | A |   | 5/1973  | Reeves et al. |
| 3,946,282 | A | * | 3/1976  | Weiss et al. .................... 361/77 |
| 3,949,336 | A |   | 4/1976  | Dietz |
| 4,081,852 | A |   | 3/1978  | Coley et al. |
| 5,224,006 | A |   | 6/1993  | MacKenzie et al. |
| 5,260,676 | A |   | 11/1993 | Patel et al. |
| 5,293,522 | A |   | 3/1994  | Fello et al. |
| 5,541,800 | A |   | 7/1996  | Misencik |
| 5,691,869 | A |   | 11/1997 | Engel et al. |
| 5,982,593 | A |   | 11/1999 | Kimblin et al. |
| 6,052,265 | A |   | 4/2000  | Zaretsky et al. |
| 6,246,558 | B1 |  | 6/2001  | DiSalvo et al. |
| 6,442,007 | B1 | * | 8/2002 | Li ............................... 361/42 |
| 6,671,145 | B2 |  | 12/2003 | Germain et al. |
| 6,867,954 | B2 |  | 3/2005  | Wu et al. |
| 7,298,598 | B1 | * | 11/2007 | Morgan et al. ................ 361/45 |
| 2004/0070896 | A1 | | 4/2004  | Silverman |
| 2005/0168893 | A1 | | 8/2005  | Silverman |

* cited by examiner

Primary Examiner—Ronald W Leja
(74) Attorney, Agent, or Firm—Martin J. Moran (57) ABSTRACT

A receptacle includes a line conductor, a load conductor, a neutral conductor, a load neutral conductor, a ground conductor, first separable contacts electrically connected between the line and load conductors, and second separable contacts electrically connected between the neutral and load neutral conductors. An operating mechanism is structured to open and close the first and second separable contacts. A number of voltages are input from at least some of the conductors. An electronic trip mechanism automatically detects: (a) an arc fault trip condition, and (b) a second different miswiring condition from the voltages and cooperates with the operating mechanism to trip open the separable contacts in response to the automatically detected miswiring condition.

24 Claims, 4 Drawing Sheets

ELECTRICAL SWITCHING APPARATUS AND RECEPTACLE INCLUDING AUTOMATIC MISWIRING PROTECTION

BACKGROUND OF THE INVENTION

1. Field of the Invention

This invention pertains generally to electrical switching apparatus and, more particularly, to receptacles.

2. Background Information

Receptacles are outlet circuit interrupters, which are intended to be installed at a branch circuit outlet, such as an outlet box, in order to provide, for example, arc fault and/or ground fault protection of loads.

Known receptacles typically include both a reset button and a test button. The reset button is used to activate a reset cycle, which attempts to reestablish electrical continuity between input and output conductive paths or conductors. While the test button is depressed, test contacts are closed to complete a test circuit, in order that a test cycle is activated. The test cycle tests the operation of the circuit interrupting mechanism.

Known ground fault and arc fault receptacles provide "reverse feed" protection. Such receptacles require either a mechanical lockout/interlock or a relatively complicated interaction with a manual test button.

U.S. Pat. No. 6,867,954 discloses a GFCI receptacle which, if inadvertently miswired by connecting an alternating current source to the receptacle load rather than to the receptacle line input, affords a positive indication to the installer or user of the existence of the miswiring condition, such that a reset button cannot be depressed.

U.S. Pat. No. 6,671,145 discloses a resettable circuit interrupting device that locks out a reset function under certain conditions. A test mechanism is utilized to test the circuit interrupter before allowing a reset. A reset plunger is modified to exert force on a trip latch in order to close a test circuit that will allow the reset plunger to continue to a reset position only if the circuit interrupter is functioning.

U.S. Pat. No. 6,246,558 discloses a circuit interrupting device including a reset lockout portion that prevents reestablishing electrical continuity in phase and neutral conductive paths if the circuit interrupting portion is non-operational, if an open neutral condition exists or if a reverse wiring condition exists. The reset portion includes a reset button and at least one reset contact which when depressed is capable of contacting at least a portion of the phase conductive path to cause a predetermined condition. If the circuit interrupting portion is operational, then the circuit interrupting portion is activated to disable the reset lockout portion and facilitate reestablishing electrical continuity in the phase and neutral conductive paths. Otherwise, if the circuit interrupting portion is non-operational, the reset lockout portion remains enabled so that reestablishing electrical continuity in the phase and neutral conductive paths is prevented.

U.S. Patent Application Publication No. 2004/0070896 discloses an electrical ground protection device incorporated into an electrical outlet to provide electrocution protection with regard to any appliance(s) plugged into that particular electrical outlet. An electrical circuit of the electrical ground protection device includes three three-pole double-throw relays, each of which includes a sensing coil and a set of three normally-open contact switches which are operated by the sensing coil. The three sensing coils are electrically connected between three different pairs of input line, neutral and ground conductors. Three contact switches, one from each of the three-pole double-throw relays, are electrically connected in series between one of the three input conductors and a corresponding one of three output conductors.

There is room for improvement in electrical switching apparatus, such as receptacles.

SUMMARY OF THE INVENTION

These needs and others are met by the present invention, which provides an electrical switching apparatus including electronic automatic swapped line and neutral protection or automatic reverse feed protection, which open separable contacts to prevent downstream power flow upon detection of a miswiring condition.

In accordance with one aspect of the invention, an electrical switching apparatus comprises: a line conductor; a load conductor; at least one neutral conductor; separable contacts electrically connected between the line conductor and the load conductor; an operating mechanism structured to open and close the separable contacts; a first input inputting a first voltage between the line conductor and the at least one neutral conductor; a second input inputting a second voltage between the load conductor and the at least one neutral conductor; and a trip mechanism structured to automatically detect a reverse feed condition from the first and second voltages of the first and second inputs, respectively, and to cooperate with the operating mechanism to trip open the separable contacts in response to the automatically detected reverse feed condition.

The trip mechanism may be further structured to detect the reverse feed condition and initiate a trip signal to trip open the operating mechanism when the first voltage is less than a first predetermined value, and the second voltage is greater than a second predetermined value, which is greater than the first predetermined value.

The trip mechanism may comprise an arc fault or ground fault protection circuit, a reset button structured to cooperate with the operating mechanism to close the separable contacts, and a test circuit structured to test the arc fault or ground fault protection circuit; and the trip mechanism may be further structured to detect the reverse feed condition in response to the test circuit when the separable contacts are closed.

The reset button and the operating mechanism may be further structured to inhibit closing the separable contacts in response to the trip signal.

The trip mechanism may be further structured to remove the trip signal as a function of the first voltage and the second voltage when: (a) both of the first voltage and the second voltage are less than the first predetermined value, or (b) the second voltage is less than the first predetermined value and the first voltage is greater than the second predetermined value.

The trip mechanism may be powered from both of the first voltage from the line conductor and the second voltage from the load conductor.

The trip mechanism may be further structured to remove the trip signal after a predetermined time.

The trip mechanism may be further structured to remove the trip signal after a predetermined time and re-initiate the trip signal when the first voltage is less than the first predetermined value, and the second voltage is greater than the second predetermined value, which is greater than the first predetermined value.

As another aspect of the invention, an electrical switching apparatus comprises: a line conductor; a load conductor; at least one neutral conductor; a ground conductor; separable contacts electrically connected between the line conductor and the load conductor; an operating mechanism structured to open and close the separable contacts; an input inputting a voltage between the at least one neutral conductor and the ground conductor; and an electronic trip mechanism structured to automatically detect: (a) a first trip condition operatively associated with current flowing through the separable contacts, and (b) a second different swapped line and neutral condition from the voltage, the electronic trip mechanism cooperating with the operating mechanism to trip open the separable contacts in response to the first trip condition or the second different swapped line and neutral condition.

The electronic trip mechanism may be further structured to detect the second different swapped line and neutral condition and initiate a trip signal to trip open the operating mechanism when the voltage is greater than a predetermined value.

The predetermined value may be a second predetermined value; and the electronic trip mechanism may be further structured to remove the trip signal when the voltage is less than a first predetermined value, which is less than the second predetermined value.

The electronic trip mechanism may be further structured to annunciate the second different swapped line and neutral condition.

The electrical switching apparatus may be a receptacle; the separable contacts may be a single set of separable contacts electrically connected between the line conductor and the load conductor; and the line conductor and the load conductor may be directly electrically connected together by the single set of separable contacts.

The electrical switching apparatus may be a circuit breaker; and the electronic trip mechanism may comprise a processor initiating a trip signal, and a trip solenoid receiving the trip signal and cooperating with the operating mechanism to trip open the operating mechanism in response to the trip signal.

As another aspect of the invention, an electrical switching apparatus comprises: a line conductor; a load conductor; a neutral conductor; a load neutral conductor; a ground conductor; first separable contacts electrically connected between the line conductor and the load conductor; second separable contacts electrically connected between the neutral conductor and the load neutral conductor; an operating mechanism structured to open and close the first and second separable contacts; at least one input inputting at least one voltage from at least some of the conductors; and an electronic trip mechanism structured to automatically detect: (a) a first trip condition operatively associated with the separable contacts, and (b) a second different miswiring condition from the at least one voltage, the electronic trip mechanism cooperating with the operating mechanism to automatically trip open the separable contacts in response to the first trip condition or the second different miswiring condition.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As employed herein, the statement that a part is "electrically interconnected with" one or more other parts shall mean that the parts are directly electrically connected together or are electrically connected together through one or more electrical conductors or generally electrically conductive intermediate parts. Further, as employed herein, the statement that a part is "electrically connected to" one or more other parts shall mean that the parts are directly electrically connected together or are electrically connected together through one or more electrical conductors. Also, as employed herein, the statement that two parts are "directly electrically connected together by" another part shall mean that the two parts are directly electrically connected together by only such other part.

As employed herein, the term "number" shall mean one or an integer greater than one (i.e., a plurality).

The present invention is described in association with an arc fault/ground fault receptacle or circuit breaker, although the invention is applicable to a wide range of electrical switching apparatus, which employ a number of trip mechanisms.

Figure 1:
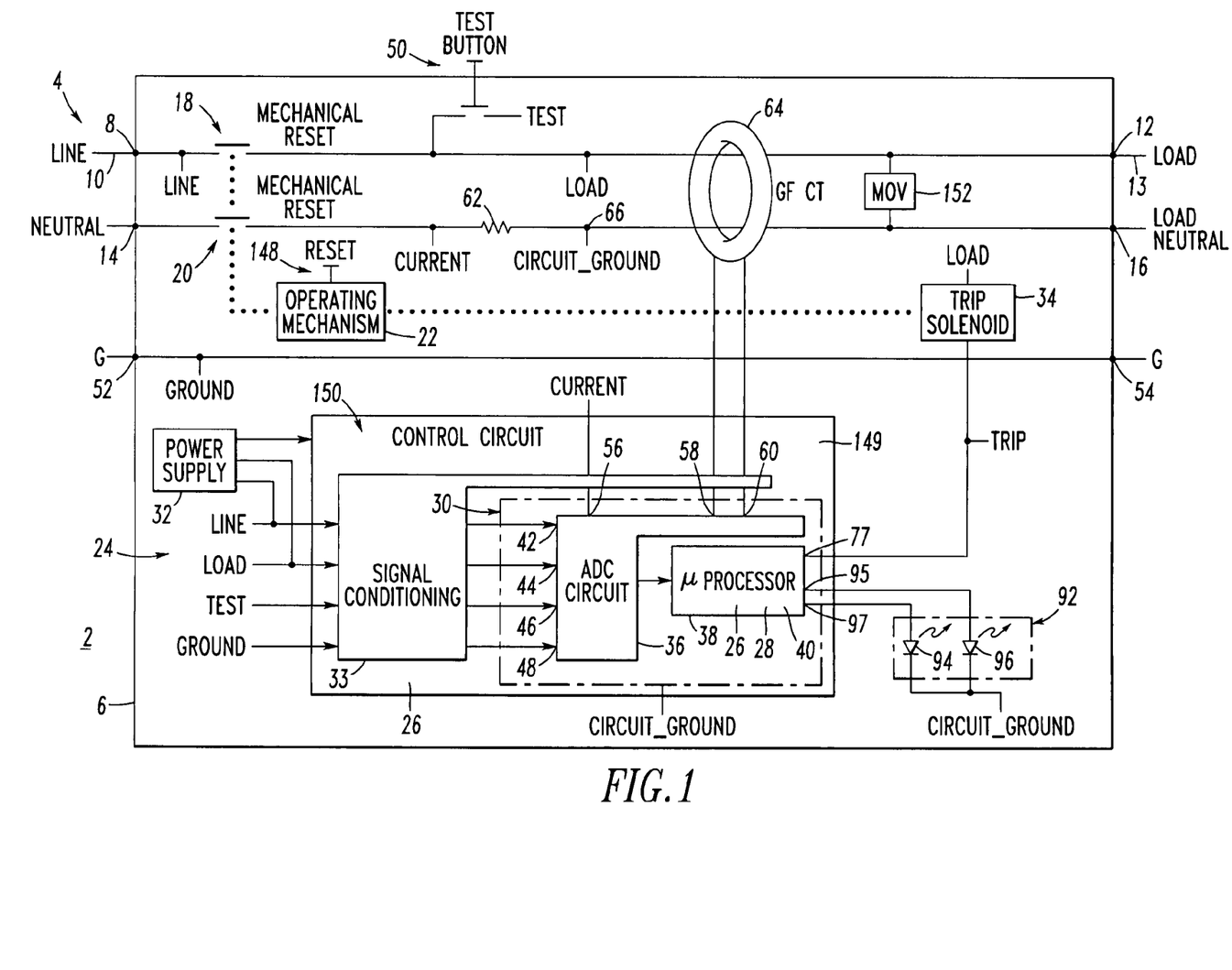
FIG. 1 is a block diagram of a receptacle in accordance with the present invention.

Referring to FIG. 1, a receptacle 2 for a power circuit 4 includes a receptacle housing 6, a line conductor, such as terminal 8, structured to receive a voltage 10, a load terminal 12, structured to output a voltage 13, and one or more neutral terminals, such as 14 and/or 16. One or two sets of separable contacts 18,20 are provided. One set 18 of the separable contacts is electrically connected between the line terminal 8 and the load terminal 12. Another set 20 of the separable contacts may be electrically connected between the neutral terminal 14 and the load neutral terminal 16. An operating mechanism 22 is structured to open and close the separable contacts 18,20. A trip mechanism 24 cooperates with the operating mechanism 22 to trip open the separable contacts 18,20. The trip mechanism 24 includes a first circuit 26 structured to detect a first trip condition (e.g., without limitation, arc fault and/or ground fault) associated with the power circuit 4 and to responsively actuate the operating mechanism 22 to trip open the separable contacts 18,20, and a second circuit 28 structured to detect a miswiring condition (e.g., without limitation, reverse feed condition and/or swapped line and neutral condition) and to responsively actuate the operating mechanism 22 to trip open the separable contacts 18,20.

As will be discussed, below, in connection with FIGS. 2-4, the electronic trip mechanism 24 is structured to automatically detect a reverse feed condition from the line and load voltages of the analog-to-digital converter (ADC) inputs 42 and 44, respectively, and to cooperate with the operating mechanism 22 to trip open the separable contacts 18,20 in response to the automatically detected reverse feed condition. The electronic trip mechanism 24 is further structured to automatically detect: (a) a first trip condition (e.g., without limitation, arc fault and/or ground fault) operatively associated with current flowing through the separable contacts 18,20, and (b) a second different swapped line and neutral condition from the ground voltage of the ADC input 48, and to cooperate with the operating mechanism 22 to trip open the separable contacts 18,20 in response to the first trip condition or the second different swapped line and neutral condition. The electronic trip mechanism 24 is further structured to automatically detect a second different miswiring condition from a number of the voltages from the ADC inputs 42,44,48 and to cooperate with the operating mechanism 22 to trip open the separable contacts 18,20 in response to the automatically detected miswiring condition.

EXAMPLE 1

The example trip mechanism 24 includes a microcontroller 30, a power supply 32, a signal conditioning circuit 33 and a trip solenoid 34. The microcontroller 30 includes the ADC circuit 36 and a microprocessor 38 having a firmware routine 40. The ADC circuit 36 includes a plurality of sensors, such as ADC inputs 42,44,46,48 for sensing voltages respectively corresponding to the line terminal 8 (LINE), the load terminal 12 (LOAD), a test button 50 (TEST) and one or more ground terminals 52, 54 (GROUND). The ADC circuit 36 further includes a plurality of sensors, such as ADC inputs 56 and 58,60, for sensing voltages corresponding to a neutral shunt 62 (CURRENT) and the two sense inputs from a ground fault current transformer 64, respectively. The microcontroller 30 and the various voltages are referenced to a circuit ground (CIRCUIT_GROUND) on the load neutral side of the neutral shunt 62 at node 66.

The neutral shunt 62 includes a voltage (CURRENT) corresponding to current flowing through the separable contacts 20. The ADC input 56 senses that voltage (CURRENT) and provides that sensed voltage for step 76 of FIG. 2, as will be discussed.

The current transformer 64 includes a signal corresponding to the difference between current flowing through the separable contacts 18 and the load terminal 12 and current flowing through the separable contacts 20 and the load neutral terminal 16. The ADC inputs 58,60 sense this voltage and provide the corresponding value for step 76 of FIG. 2.

EXAMPLE 2

Figure 2:
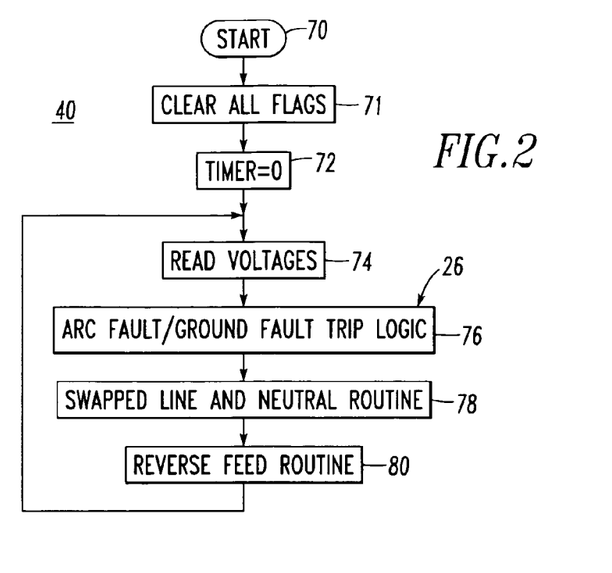
FIG. 2 is a flowchart of a routine executed by the processor of FIG. 1 to provide arc fault/ground fault protection and miswiring protection.

Referring to FIG. 2, the example firmware routine 40 is shown. After starting at 70, all subsequently employed flags are cleared, at 71, and a timer (e.g., hardware; firmware) value is set to zero at 72. Next, at 74, the microprocessor 38 (FIG. 1) reads and suitably processes the various voltages corresponding to the ADC inputs 42,44,46,48,56,58,60. Then, at 76, arc fault/ground fault trip logic is executed to process the current value associated with the ADC input 56 and the two sense inputs from the ground fault current transformer 64 at ADC inputs 58,60. Under arc fault or ground fault trip conditions, the microprocessor 38 sets a digital output 77, which provides a TRIP signal to the trip solenoid 34, in order to trip open the separable contacts 18,20. Next, at 78, a swapped line and neutral routine (FIG. 3) is executed after which, at 80, a reverse feed routine (FIG. 4) is executed, after which step 74 is repeated.

The microprocessor 38 and the firmware routine steps 76,78,80 actuate the operating mechanism 22 by issuing the trip signal through digital output 77 to the trip solenoid 34, in order to trip open the separable contacts 18,20 and protect a load (not shown) downstream of the load terminal 12 from arc fault, ground fault, swapped line and neutral, and/or reverse feed conditions. Although three steps 76,78,80 are shown, only one or two of steps 78 and 80 need to be employed.

EXAMPLE 3

Figure 3:
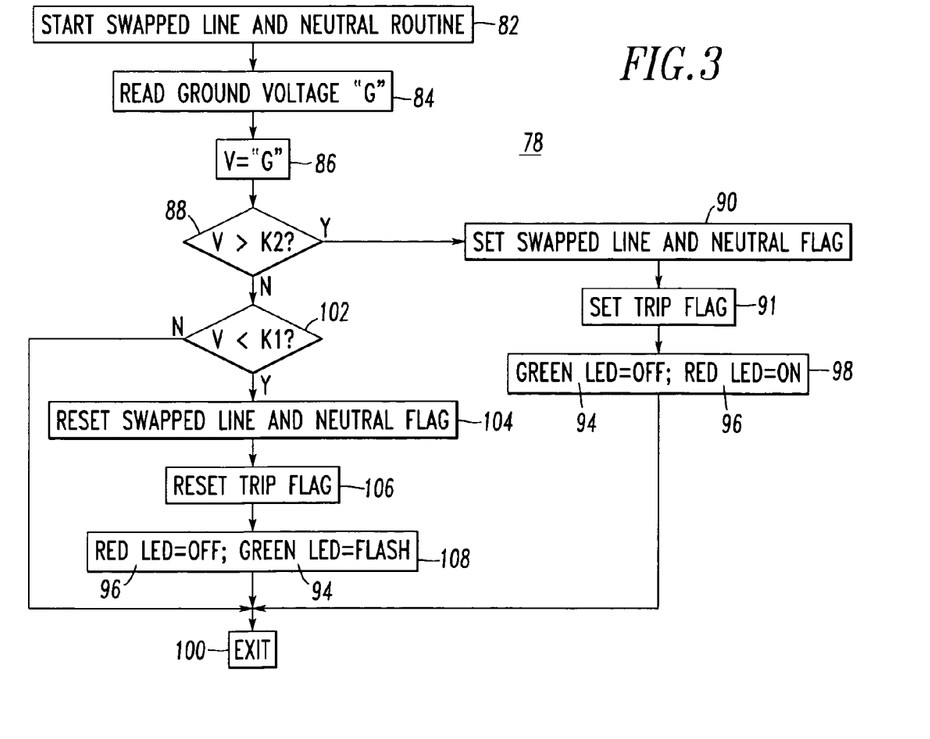
FIG. 3 is a flowchart of a routine executed by the processor of FIG. 1 to provide swapped line and neutral protection.

Referring to FIG. 3, the swapped line and neutral routine 78 starts at 82. Next, at 84, the voltage of the ground terminal 52 (GROUND or "G") with respect to the reference node 66 (CIRCUIT_GROUND) of FIG. 1 is read. Then, at 86, value V is set equal to the voltage "G". Next, at 88, it is determined if value V is greater than a predetermined value K2 (e.g., without limitation, a suitable value; about 60 VAC). If so, then at 90, a swapped line and neutral flag is set and, at 91, a trip flag is set. As will be discussed, below, in connection with FIG. 4, responsive to the trip flag, the microprocessor 38 (FIG. 1) sets the digital output 77, which provides the TRIP signal to the trip solenoid 34, in order to trip open the separable contacts 18,20.

For purposes of indication, the receptacle 2 preferably includes a suitable indication circuit 92 (FIG. 1) structured to indicate different fault conditions. For example, the circuit 92 includes a first LED 94 driven by microprocessor output 97 and a second LED 96 driven by microprocessor output 95. At step 98 of the routine 78, the first LED 94 (e.g., without limitation, green) is turned off and the second LED 96 (e.g., without limitation, red) is turned on to indicate the miswiring (swapped line and neutral) condition. After 98, the routine 78 exits or returns at 100.

On the other hand, at 88, if value V was not greater than the predetermined value K2, then, at 102, it is determined if value V is less than a smaller predetermined value K1 (e.g., without limitation, a smaller suitable value; about 10 VAC). If so, then at 104, the swapped line and neutral flag is reset and, at 106, the trip flag is reset. At step 108, the first LED 94 (e.g., without limitation, green) is flashed (e.g., without limitation, on-off every 0.5 s) to indicate a normal condition and the second LED 96 (e.g., without limitation, red) is turned off to indicate that there is no miswiring condition. After 108, or if the test failed at 102, the routine 78 exits or returns at 100.

EXAMPLE 4

Figure 4:
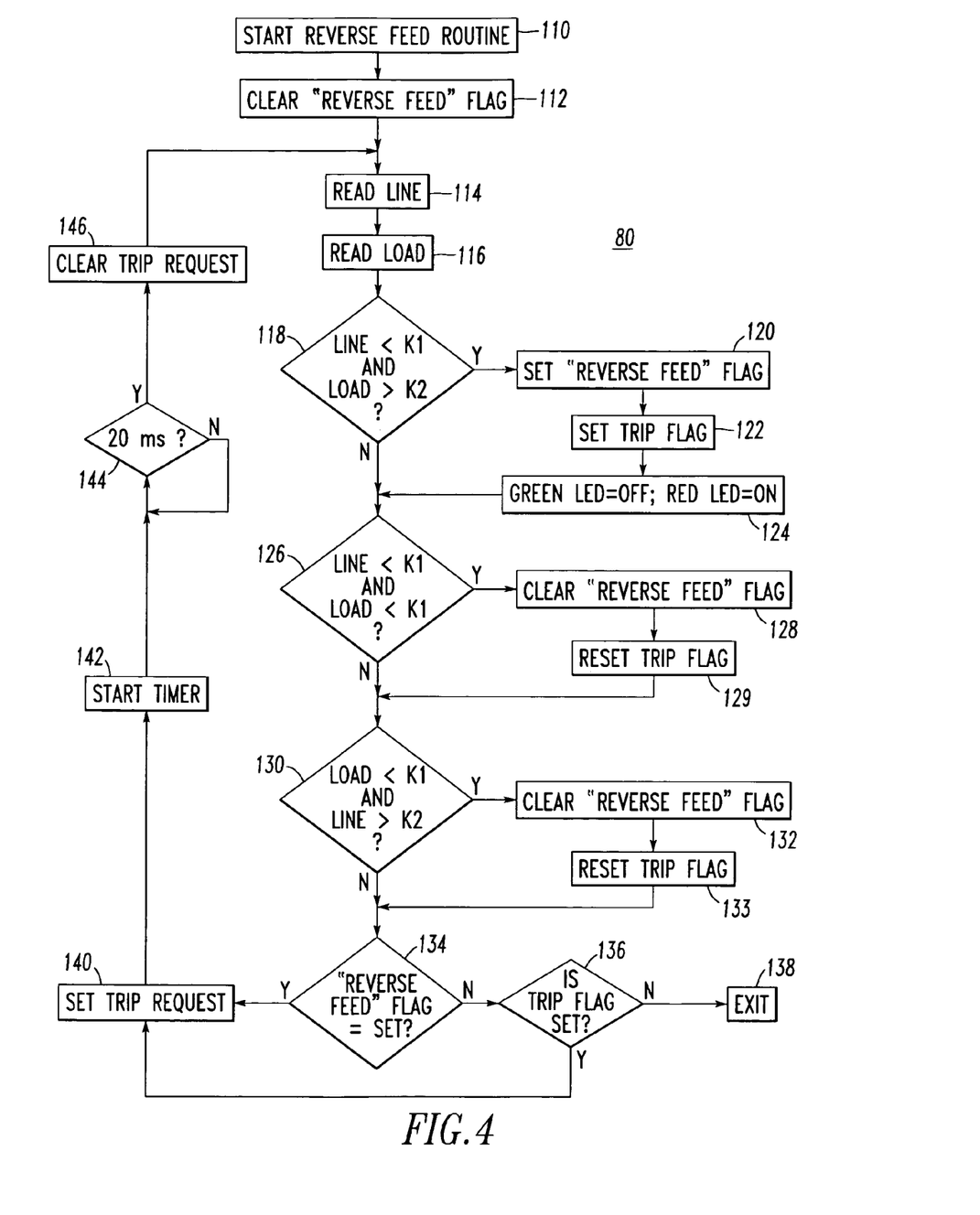
FIG. 4 is a flowchart of a routine executed by the processor of FIG. 1 to provide reverse feed protection.

FIG. 4 shows the reverse feed routine 80, which starts at 110. Next, at 112, a reverse feed flag is cleared. Then, at 114 and 116, the voltages of the line terminal 8 (LINE) and the load terminal 12 (LOAD), respectively, with respect to the reference node 66 (CIRCUIT_GROUND) of FIG. 1 are read. Then, at 118, it is determined if the line voltage is less than a predetermined value K1 (e.g., without limitation, a suitable value; about 10 VAC) and if the load voltage is greater than a predetermined value K2 (e.g., without limitation, a suitable value; about 60 VAC). If so, then at 120, the reverse feed flag is set and, at 122, the trip flag is set. At step 124, the first LED 94 (e.g., without limitation, green) is turned off and the second LED 96 (e.g., without limitation, red) is turned on to indicate that there is a miswiring (reverse feed) condition.

After 124, or if the test at 118 failed, at 126, it is determined if the line voltage is less than the predetermined value K1 and if the load voltage is less than the predetermined value K1. If so, then at 128, the reverse feed flag is cleared, and at 129, the trip flag is reset. After 129, or if the test at 126 failed, at 130, it is determined if the load voltage is less than the predetermined value K1 and if the line voltage is greater than the predetermined value K2. If so, then at 132, the reverse feed flag is cleared, and at 133, the trip flag is reset.

After 133, or if the test at 130 failed, at 134, it is determined if the reverse feed flag is set. If not, then, at 136, it is determined if the trip flag is set. If not, then the routine 80 exits or returns at 138. Otherwise, if either of the tests at 134 or 136 passed, then, at 140, a trip request is set. This trip request actuates the operating mechanism 22 of FIG. 1 by issuing the TRIP signal through digital output 77 to the trip solenoid 34, in order to trip open the separable contacts 18,20. Next, at 142, a timer (e.g., hardware; firmware) is started. Then, at 144, it is determined if a predetermined time (e.g., a suitable time; about 20 ms) has passed. If not, then step 144 is repeated. Otherwise, after the predetermined time, the trip request is cleared at 146 and step 114 is repeated.

EXAMPLE 5

The received voltage 10 of the line terminal 8 or the voltage 13 of the load terminal 12 may be an alternating current voltage including a plurality of line cycles. At step 74, the microprocessor routine 40 may be structured to determine a signal representative of one of an integrated half cycle peak voltage, an average voltage, and an RMS voltage from the sensed received voltages of ADC inputs 42,44,48.

EXAMPLE 6

Further to Example 5, in FIGS. 3 and 4, the predetermined values K1 and/or K2 may be one of an integrated voltage value, an average voltage value, and an RMS voltage value.

EXAMPLE 7

The protection circuit 26 may be, for example, one or both of an arc fault protection circuit and a ground fault protection circuit. Alternatively, other suitable trip circuit(s) may be employed. Non-limiting examples of arc fault detectors are disclosed, for instance, in U.S. Pat. No. 5,224,006, with a preferred type described in U.S. Pat. No. 5,691,869, which is hereby incorporated by reference herein. Non-limiting examples of ground fault detectors are disclosed in U.S. Pat. Nos. 5,293,522; 5,260,676; 4,081,852; and 3,736,468, which are hereby incorporated by reference herein.

EXAMPLE 8

The trip mechanism 24 is preferably structured to annunciate the arc fault condition, the ground fault condition, the reverse feed condition and/or the swapped line and neutral condition, as will be discussed.

EXAMPLE 9

As is conventional, the operating mechanism 22 preferably includes a suitable reset mechanism, such as RESET button 148, structured to mechanically close the separable contacts 18,20. For example, the RESET button 148 and the operating mechanism 22 are structured to inhibit closing the separable contacts 18,20 in response to the TRIP signal.

EXAMPLE 10

As is conventional, the trip mechanism 24 preferably includes a suitable test mechanism, such as the TEST button 50, structured to initiate one or both of an arc fault protection test and a ground fault protection test. If the TEST signal at ADC input 46 is active, then suitable signals (not shown) are sent to the control circuit 150 to apply simulated fault signals (not shown) to test the arc fault/ground fault protection. For example, the TEST button 50 can test the dual function arc fault and ground fault trip logic 76 as disclosed in U.S. Pat. No. 5,982,593, which is hereby incorporated by reference herein.

EXAMPLE 11

Figure 5:
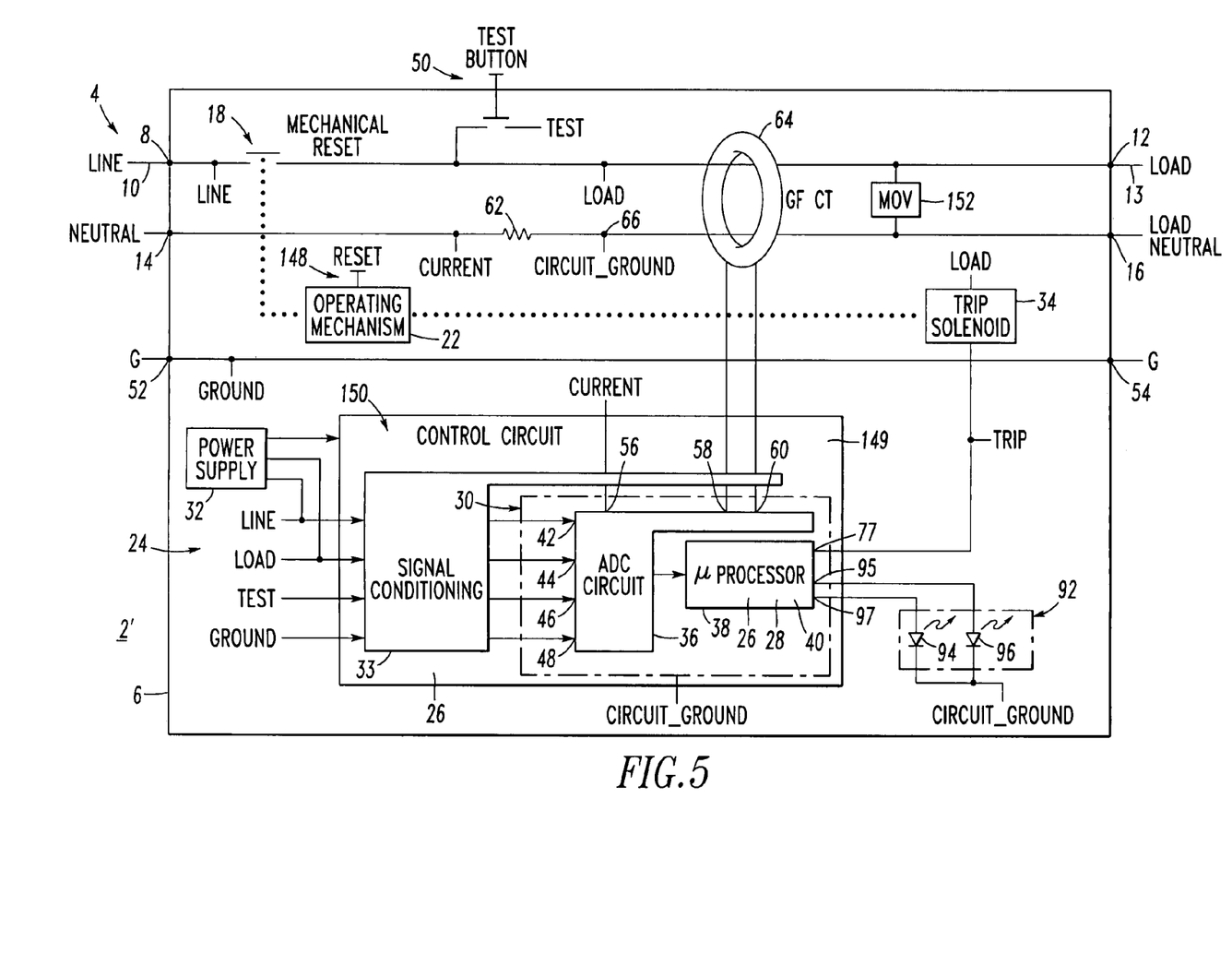
FIG. 5 is a block diagram of a circuit breaker in accordance with another embodiment of the invention.

Although two sets of separable contacts 18,20 are shown, the receptacle 2 may include a single set of separable contacts (e.g., separable contacts 18 electrically connected between the line and load terminals 8,12), as shown with the electrical switching apparatus 2' of FIG. 5.

EXAMPLE 12

As an alternative to the example red LED 96, two red LEDs (not shown), one or the other being on, are used to indicate which miswiring mode caused tripping (e.g., reverse feed, or swapped line and neutral). Furthermore, both red LEDs are on to indicate an arc fault or a ground fault trip condition.

EXAMPLE 13

As another alternative, the LED 96 is red and is flashed (e.g., at one or more different rates or different patterns) by the microprocessor output 95 to indicate at least one of the miswiring conditions, the arc fault trip condition and the ground fault trip condition, while the LED 94 is green, and when illuminated, indicates a normal receptacle condition with no fault.

EXAMPLE 14

As an alternative to Example 13, the LED 96, when illuminated, is structured to indicate the arc fault trip condition. The LED 94, when illuminated, is structured to indicate the ground fault trip condition, and when flashed, is structured to indicate a normal condition.

EXAMPLE 15

As another alternative, one of the LEDs 94, 96, such as 94, may be structured to indicate the miswiring condition by flashing a corresponding pattern, and to indicate one of the arc fault trip condition and the ground fault trip condition by being solidly illuminated.

EXAMPLE 16

Further to Example 15, both of the LEDs 94,96, when illuminated, may be structured to indicate the other one of the arc fault trip condition and the ground fault trip condition.

EXAMPLE 17

The power supply 32 is preferably powered from both (e.g., through one or more auctioneering diodes (not shown) of the load terminal 12 and the line terminal 8, in order to protect downstream load(s) under normal and reverse fed conditions. Alternatively, the power supply 32 may be powered from at least one of the terminals 8,12.

EXAMPLE 18

As shown in FIG. 1, an MOV 152 may be disposed between the load terminal 12 and the load-neutral terminal 16, in order to provide transient voltage protection.

EXAMPLE 19

The routine 8 of FIG. 4 is executed by the processor 38 of FIG. 1 to provide reverse feed (e.g., where power is improperly electrically connected to the load and load neutral terminals 12,16 rather than to the line and neutral terminals 8,14) protection. For reverse feed protection, the detection occurs only when the contacts 18,20 are opened. Thus, the receptacle 2 is shipped in the tripped condition. If the RESET button 148 is activated before installation, then the reverse feed condition is evaluated when the TEST button 50 is used to cause a trip.

The receptacle 2 preferably includes a conventional test circuit 149 structured to test the first arc fault/ground fault protection circuit 26. The trip mechanism 24 is preferably structured to detect the reverse feed condition in response to the test circuit 149 opening the separable contacts 18,20, when the separable contacts 18,20 are closed.

EXAMPLE 20

FIG. 3 shows the routine 78 executed by the processor 38 of FIG. 1 to provide swapped line and neutral (e.g., where the input line is electrically connected to the receptacle line side neutral terminal 14 and the input neutral is electrically connected to the receptacle line side line terminal 8) protection. For swapped line and neutral protection, the load neutral terminal 16 is chosen as circuit ground. Voltage is measured from ground (GROUND) to circuit ground (CIRCUIT_GROUND). If that voltage is greater than the predetermined reference value, the "swapped line and neutral" flag is set in the microprocessor 38 and the TRIP signal is then issued. The "swapped line and neutral" flag is reset when the ground voltage is essentially about zero.

EXAMPLE 21

As another example failure indication, the green LED 94 is not flashing to indicate an "end-of-life" condition.

EXAMPLE 22

The second LED 96 is off and the first LED 94 is flashed to indicate a normal condition. The first LED 94 is off and the second LED 96 is flashed to indicate the swapped line and neutral condition or the reverse feed condition. Both of the LEDs 94,96 are off to indicate an end of life condition of the receptacle 2.

EXAMPLE 23

The second LED 96 is off and the first LED 94 is flashed to indicate a normal condition. The first LED 94 is off and the second LED 96 is flashed with a first pattern or frequency to indicate the reverse feed condition. The first LED 94 is off and the second LED 96 is flashed with a second different pattern or frequency to indicate the swapped line and neutral condition. The first LED 94 is off and the second LED 96 is on to indicate an arc fault or ground fault condition. Both of the LEDs 94,96 are off to indicate an end of life condition of the receptacle 2.

EXAMPLE 24

As shown in FIG. 5, a single set of separable contacts 18 is electrically connected between the line terminal 8 and the load terminal 12 of an electrical switching apparatus 2', such as a circuit breaker or receptacle. For a circuit breaker, the TEST button 50 and the RESET button 148 need not be employed. The line and load conductors, including the line terminal 8 and the load terminal 12, are directly electrically connected together by the single set of separable contacts 18. The electrical switching apparatus 2' may be similar to the receptacle 2 of FIG. 1, except that the second set of separable contacts 20 is not employed, and the neutral terminal 14 is electrically connected to the load neutral terminal 16.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. An electrical switching apparatus comprising:
    a line conductor;
    a load conductor;
    at least one neutral conductor;
    separable contacts electrically connected between said line conductor and said load conductor;
    an operating mechanism structured to open and close said separable contacts;
    a first input inputting a first voltage between said line conductor and said at least one neutral conductor;
    a second input inputting a second voltage between said load conductor and said at least one neutral conductor; and
    a trip mechanism structured to automatically detect a reverse feed condition from the first and second voltages of said first and second inputs, respectively, and to cooperate with said operating mechanism to trip open said separable contacts in response to said automatically detected reverse feed condition.

2. The electrical switching apparatus of claim 1 wherein said trip mechanism is an electronic trip mechanism structured to detect an arc fault condition and responsively initiate a trip signal to trip open said operating mechanism, said electronic trip mechanism being further structured to initiate said trip signal in response to said automatically detected reverse feed condition when said first voltage is less than a first predetermined value, and said second voltage is greater than a second predetermined value, which is greater than said first predetermined value.

3. The electrical switching apparatus of claim 1 wherein said trip mechanism is further structured to automatically detect said reverse feed condition and to cause a trip signal to trip open said operating mechanism when said first voltage is less than a first predetermined value, and said second voltage is greater than a second predetermined value, which is greater than said first predetermined value.

4. The electrical switching apparatus of claim 3 wherein said trip mechanism comprises an arc fault or ground fault protection circuit, a reset button structured to cooperate with said operating mechanism to close said separable contacts, and a test circuit structured to test said arc fault or ground fault protection circuit; and wherein said trip mechanism is further structured to detect said reverse feed condition in response to said test circuit when said separable contacts are closed.

5. The electrical switching apparatus of claim 4 wherein said reset button and said operating mechanism are further structured to inhibit closing said separable contacts in response to said trip signal.

6. The electrical switching apparatus of claim 3 wherein said trip mechanism is further structured to remove said trip signal as a function of said first voltage and said second voltage when: (a) both of said first voltage and said second voltage are less than said first predetermined value, or (b) said second voltage is less than said first predetermined value and said first voltage is greater than said second predetermined value.

7. The electrical switching apparatus of claim 6 wherein said trip mechanism is further structured to remove said trip signal after a predetermined time.

8. The electrical switching apparatus of claim 6 wherein said trip mechanism is further structured to remove said trip signal after a predetermined time and to cause said trip signal to trip open said operating mechanism when said first voltage is less than said first predetermined value, and said second voltage is greater than said second predetermined value, which is greater than said first predetermined value.

9. The electrical switching apparatus of claim 3 wherein said trip mechanism is powered from both of the first voltage from said line conductor and the second voltage from said load conductor.

10. An electrical switching apparatus comprising:
a line conductor;
a load conductor;
at least one neutral conductor;
a ground conductor;
separable contacts electrically connected between said line conductor and said load conductor;
an operating mechanism structured to open and close said separable contacts;
an input inputting a voltage between said at least one neutral conductor and said ground conductor; and
an electronic trip mechanism structured to automatically detect: (a) a first trip condition operatively associated with current flowing through said separable contacts, and (b) a second different swapped line and neutral condition from said voltage, said electronic trip mechanism cooperating with said operating mechanism to trip open said separable contacts in response to said first trip condition or said second different swapped line and neutral condition.

11. The electrical switching apparatus of claim 10 wherein said electronic trip mechanism is further structured to detect said second different swapped line and neutral condition and initiate a trip signal to trip open said operating mechanism when said voltage is greater than a predetermined value.

12. The electrical switching apparatus of claim 11 wherein said predetermined value is a second predetermined value; and wherein said electronic trip mechanism is further structured to remove said trip signal when said voltage is less than a first predetermined value, which is less than said second predetermined value.

13. The electrical switching apparatus of claim 11 wherein said electronic trip mechanism is further structured to annunciate said second different swapped line and neutral condition.

14. The electrical switching apparatus of claim 10 wherein said electronic trip mechanism comprises a first indicator and a second indicator, said second indicator being off and said first indicator being flashing to indicate a normal condition, said first indicator being off and said second indicator being flashing to indicate said second different swapped line and neutral condition, and both of said first and second indicators being off to indicate an end of life condition of said electrical switching apparatus.

15. The electrical switching apparatus of claim 10 wherein said electronic trip mechanism is further structured to automatically detect a reverse feed condition; and wherein said electronic trip mechanism comprises at least one of an arc fault protection circuit and a ground fault protection circuit structured to output a trip signal to said operating mechanism responsive to said first trip condition, a first indicator and a second indicator, said second indicator being off and said first indicator being flashing to indicate a normal condition, said first indicator being off and said second indicator being flashing with a first pattern to indicate said reverse feed condition, said first indicator being off and said second indicator being flashing with a second pattern to indicate said second different swapped line and neutral condition, said first indicator being off and said second indicator being on to indicate an arc fault or ground fault condition, and both of said first and second indicators being off to indicate an end of life condition of said electrical switching apparatus.

16. The electrical switching apparatus of claim 10 wherein said electronic trip mechanism comprises a processor; wherein said first input comprises a first analog to digital converter channel cooperating with said processor to input said first voltage thereto; and wherein said second input comprises a second analog to digital converter channel cooperating with said processor to input said second voltage thereto.

17. The electrical switching apparatus of claim 10 wherein said electrical switching apparatus is a receptacle; wherein said separable contacts are a single set of separable contacts electrically connected between said line conductor and said load conductor; and wherein said line conductor and said load conductor are directly electrically connected together by said single set of separable contacts.

18. The electrical switching apparatus of claim 10 wherein said electrical switching apparatus is a circuit breaker; and wherein said electronic trip mechanism comprises a processor initiating a trip signal, and a trip solenoid receiving said trip signal and cooperating with said operating mechanism to trip open said operating mechanism in response to said trip signal.

19. An electrical switching apparatus comprising:
a line conductor;
a load conductor;
a neutral conductor;
a load neutral conductor;
a ground conductor;
first separable contacts electrically connected between said line conductor and said load conductor;
second separable contacts electrically connected between said neutral conductor and said load neutral conductor;
an operating mechanism structured to open and close said first and second separable contacts;
at least one input inputting at least one voltage obtained from at least a plurality of said conductors; and
an electronic trip mechanism structured to automatically detect: (a) a first trip condition operatively associated with said separable contacts, and (b) a second different miswiring condition from said at least one voltage, said electronic trip mechanism cooperating with said operating mechanism to automatically trip open said separable contacts in response to said first trip condition or said second different miswiring condition.

20. The electrical switching apparatus of claim 19 wherein said at least one voltage is a first voltage and a second voltage; wherein said at least one input comprises a first input and a second input, said first input inputting the first voltage between said line conductor and said neutral conductor, said second input inputting the second voltage between said load conductor and said load neutral conductor; wherein said miswiring condition is a reverse feed condition; and wherein said electronic trip mechanism is further structured to detect said reverse feed condition and initiate a trip signal to trip open said operating mechanism when said first voltage is less than a first predetermined value, and said second voltage is greater than a second predetermined value, which is greater than said first predetermined value.

21. The electrical switching apparatus of claim 19 wherein said at least one voltage is a voltage; wherein said at least one input is an input inputting the voltage between said neutral conductor and said ground conductor; wherein said miswiring condition is a swapped line and neutral condition; and wherein said electronic trip mechanism is further structured to detect said swapped line and neutral condition and initiate a trip signal to trip open said operating mechanism when said voltage is greater than a predetermined value.

22. The electrical switching apparatus of claim 19 wherein said first trip condition is an arc fault trip condition.

23. The electrical switching apparatus of claim 10 wherein said electronic trip mechanism comprises a microcomputer including said input.

24. The electrical switching apparatus of claim 19 wherein said electronic trip mechanism comprises a microcomputer including said at least one input.

* * * * *